Figure 1:
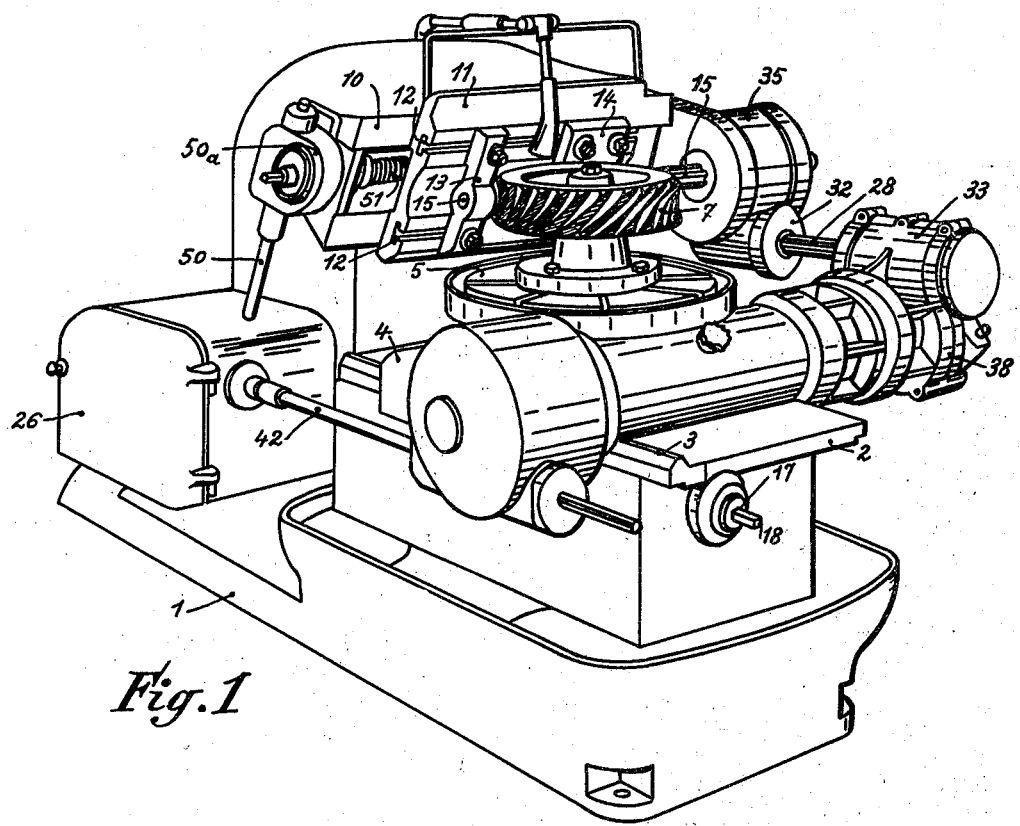

Dec. 14, 1937.  G. LECHESNE  2,102,540
MACHINE FOR HOBBING THE TEETH OF WORM WHEELS
Filed July 7, 1936  2 Sheets-Sheet 1

Inventor
Gabriel Lechesne
By Bringer, atty.

Inventor
Gabriel Lechesne
By Bilinger, atty.

UNITED STATES PATENT OFFICE 2,102,540

MACHINE FOR HOBBING THE TEETH OF WORM WHEELS

Gabriel Lechesne, Montreuil-sous-Bois, France, assignor to Paul Durand, Neuilly-sur-Seine, France Application July 7, 1936, Serial No. 89,407
In Great Britain July 29, 1935

4 Claims. (Cl. 90—4)

The present invention relates to improvements in machines for hobbing the teeth of worm wheels.

The only theoretical means of obtaining a perfect worm wheel is to cut with a revolving tool simple or multiple, which is adapted to move tangentially in relation to the worm wheel to be cut and which is itself driven with a rotary movement.

The plate which carries the said part to be cut and the cutting tool must turn in relation to each other under perfectly defined conditions which constitute the exact relation between the worm and the wheel and the fact of the tangential advance of the tool necessitates interposing a differential movement in the drive of the plate in order that the rotation of the latter shall be modified in co-relationship with the tangential advance of the tool.

But these machines which are simple enough in principle have not been produced in a practical manner for obtaining the absolute co-relationship which is indispensable between the movements of the tool and the worm wheel to be cut. The drive for the two main parts: tool holder and work holder has, in fact, hitherto been provided by gears, and by means of too large a number of intermediate parts placed between these two parts for the purpose of co-ordinating their movement. These machines therefore have as their chief defects, apart from being complicated, play and deflections which bring about numerous and serious imperfections in the wheels being produced.

The machine according to the present invention ensures absolute co-relation between the rotation of the tool and that of the wheel to be cut this being obtained on the one hand as regards the operation of the tool and the plate carrying the wheel to be cut by the use of worm gears with very robust irreversible construction, the shaft carrying the driving worm being provided with a heavy flywheel which revolves very quickly and so gives to the worm a very steady motion, and on the other hand by reducing in the proportion of ten to one the number of parts in movement which connect the drive of the tool and the plate carrying the wheel to be hobbed.

In this way there is obtained in addition to an absolute co-relationship of the rotations, a very great rigidity of the assembly which allows of the tools working without any deflection of the parts giving rise to a lag in rotation which must be avoided.

According to the present invention a machine for hobbing worm wheels is provided, characterized by a driving shaft which simultaneously transmits its rotary movement to the tool-holding spindle through an irreversible worm and wheel gear and to the plate carrying the wheel to be hobbed, through the intermediary on the one hand of a worm gear couple the ratio of which is that of the couple to be hobbed and on the other hand of the satellite carrying spider of a differential gear one of the sun wheels of which is secured to a worm gearing with a gear wheel integral with the said plate and the other sun wheel receiving a slow advance or retard movement from a gear box.

A characteristic feature of the invention resides in the fact that owing to their disposition the above mentioned parts can be very strongly made and thus be subject to no deflection whatever.

Figure 2:
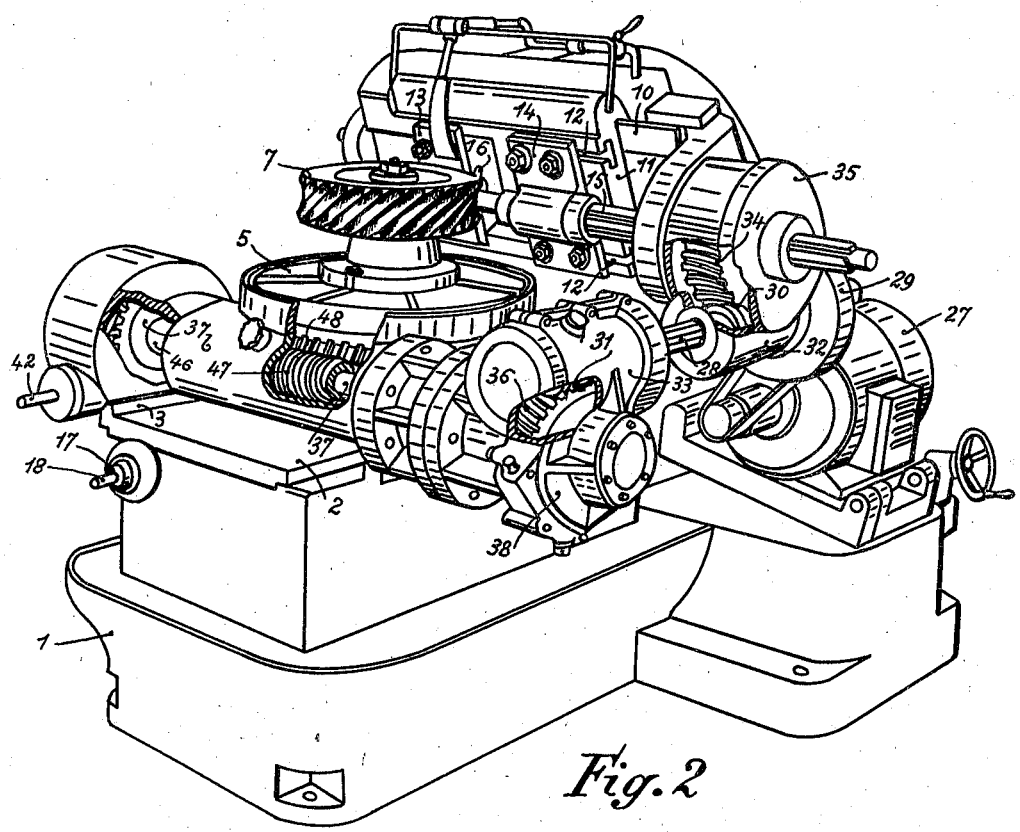
Figure 3:
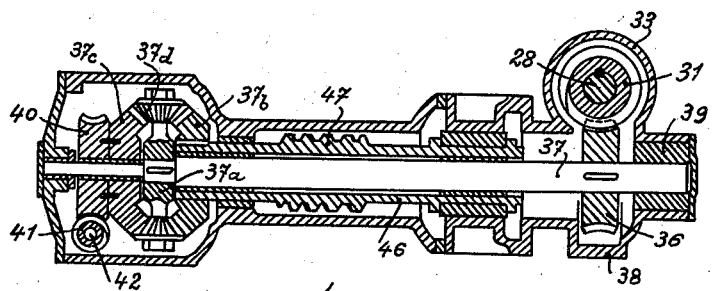

A constructional form of the invention is described hereinafter by way of example and illustrated in the accompanying drawings which show:

Fig. 1 a complete view of gear hobbing machine constructed according to the invention;

Fig. 2 the same machine with part sections to show certain of the details;

Fig. 3 the section of the driving means for the plate carrying the wheel to be cut.

In the said form of construction, the machine (Fig. 1) is provided with a frame or base 1 carrying a table 2 with longitudinal guide rail 3.

On the table 2 and on its rail 3 can slide a carriage 4 carrying a horizontal plate 5.

On the other hand, the frame 1 also carries in a vertical part above or higher than the plate 5, a transverse slide-way 10 on which can slide a carriage 11 perpendicularly to the direction of sliding of the carriage 4.

The carriage 11 is provided with slides 12 on which can slide two supports 13 and 14 carrying bearings in which the spindle 15 carrying the cutting tool 16, can freely rotate.

The displacement of the carriage 4 is obtained by means of a spindle 17 driving in the usual manner and endless screw acting on a nut or equivalent member carried by the carriage. A handle fitting onto a square end 18 provided on the shaft 17 permits of causing the carriage to slide and of regulating in this manner the distance between the axis of rotation of the plate and the longitudinal axis of the tool carrying spindle according to the diameter of the wheel to be treated, marked 7, which is secured on this plate.

On the base of the frame 1 (Fig. 2) is mounted an electric motor 27 coupled by belt or otherwise to a main driving shaft 28 disposed longitudinally at the side of the machine.

This shaft carries a heavy flywheel 29 the rapid rotation of which gives a very steady movement to the shaft and absorbs the shocks produced by the action of the tools.

On this shaft 28 are secured two worms 30 and 31 protected by casings 32 and 33 carrying bearings for the shaft 28.

With the worm 30 there engages a wheel 34 having helicoidal teeth carried by the spindle 15. The wheel 34 is housed in a casing 35 integral with the frame of the machine and drives the spindle 15 which is grooved along one part of its length in order that it may be able to slide in the said wheel 34 and follow the longitudinal movements of the carriage 11 carrying the spindle 15.

With the worm 31 engages another wheel having helicoidal teeth marked 36 fast on the solid shaft 37 disposed like the spindle 15 perpendicularly in relation to the driving shaft 28.

This couple (wheel 36 and worm 31) has exactly the same gear ratio as that of the couple to be produced.

The wheel 36 is housed in a casing 38 likewise carrying one of the bearings 39 for the shaft 37 (Figs. 2 and 3).

The shaft 37 has keyed thereon a satellite carrying spider 37a of a differential gear, or said spider might be formed integral with the shaft 37. One of the sun wheels 37b is keyed to a worm 47 which drives the wheel 48 of the plate 5 and the other, 37c, is keyed to a worm wheel 40.

The shaft 37 traverses the hub of the worm 47. The spider 37a carries two or several satellites 37d which engage with the sun wheels 37b, 37c.

The worm wheel 40 is driven by a worm 41 receiving its movement from a shaft 42 emanating from a feed box 26 in which an electric motor and various gear wheels permit of rotating on the one hand the said shaft 42 driving the differential gear and on the other hand a shaft 50 which drives through the intermediary of a worm wheel situated at 50a, a screw 51 which through a nut, causes the advance of the carriage 11.

This feed box 26 has no special technical features its purpose being simply to give to the shaft 50 effecting the advance movement and the shaft 42 driving the differential, a few turns determined by calculation taking the following into consideration:

If the sun wheel 37c is rendered stationary because of the immobility of the toothed wheel 40 with which it is integral the plate and the tool holder spindle rotate exactly in relation to each other in ratio of the worm 31 and of the worm wheel 36.

But as the carriage 11 which carries the tool intended to form the teeth receives a slow and regular movement from the shaft 50 and the screw 51 above mentioned, it is indispensable that the worm wheel to be hobbed, placed on the plate, shall gain or lose on its pitch diameter a displacement equal to the linear lateral displacement of the tool.

It will be easy to understand that it is then necessary to give to the shafts 42 and 50 proportionate movements of rotation to obtain the result sought.

The operation of the machine is very simple:

The shaft 28 in rotating drives, on the one hand, the spindle 15 and on the other hand, the shaft 37 which in its turn, drives the differential system and thereby the worm 47 operating the plate.

The sun pinion wheel 37c keyed to the wheel 40 receives from the latter, by reason of the rotation of the shaft 42, a movement which conjugates the rotation of the plate 5 with the tangential advance of the carriage 11.

Presuming that the differential is stationary, worm 47 rotates exactly twice as fast as the shaft 37 which shows that the driving gear couple for the plate must be reduced exactly twice as much as that for the drive of the tool carrying spindle. Thus, if a worm couple 30—wheel 34 of ratio 1/30 is used it is necessary to place a worm couple 47—wheel 48 of ratio 1/60.

As has been explained previously the effect of the differential takes place only in relation of the lateral displacement of the carriage 11 for the tool holder.

The work can be carried out with extreme regularity by reason of the heavy masses brought into very rapid movement (flywheel 29 and driving shaft 28).

What I claim, is:

1. A machine for cutting worm gears comprising a horizontal rotary platform for receiving the blank, a horizontal rotary tool support for the cutting tool, a principal shaft actuated by a motor for controlling the said platform and said support, a worm keyed on the motor shaft meshing with a gear keyed on the tool support, a second worm keyed on said motor shaft and meshing with a gear keyed to a second shaft perpendicular to the motor shaft, this second shaft actuating the planetary wheels of a differential of which the first planetary wheel operates a hollow shaft carrying a worm in mesh with a gear fixed to said platform.

2. In a machine, as set forth in claim 1, the second shaft perpendicular to the motor shaft extending into the said hollow shaft for positioning the differential upon the same axis as the worm meshing with the gear wheel fixed to the platform and for reducing to a minimum thereby the length of the shafts and the number of intermediate elements.

3. In a machine, as set forth in claim 1, the second shaft perpendicular to the shaft of the motor extending into the said hollow shaft for positioning the differential and the worm meshing with the gear of the platform on the said axis at right angles to the motor shaft.

4. In a machine, as set forth in claim 1, the said second shaft perpendicular to the motor shaft extending into the said hollow shaft for positioning the differential and the worm meshing with the gear wheel of the platform on the same axis at right angles to the shaft of the motor and parallel to the tool support, so that the platform and the tool support are interconnected by three lines of transmission only.

GABRIEL LECHESNE.